United States Patent
Toda et al.

(10) Patent No.: US 11,420,297 B2
(45) Date of Patent: Aug. 23, 2022

(54) PRODUCTION METHOD FOR A CYLINDER DEVICE

(71) Applicant: HITACHI ASTEMO, LTD., Ibaraki (JP)

(72) Inventors: Shimpei Toda, Hitachinaka (JP); Ryuichi Yamanaka, Hitachinaka (JP); Michinori Nakayama, Hitachinaka (JP); Daimu Inoue, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/434,021

(22) PCT Filed: Jan. 15, 2020

(86) PCT No.: PCT/JP2020/001025
§ 371 (c)(1),
(2) Date: Aug. 26, 2021

(87) PCT Pub. No.: WO2020/217602
PCT Pub. Date: Oct. 29, 2020

(65) Prior Publication Data
US 2022/0126406 A1    Apr. 28, 2022

(30) Foreign Application Priority Data
Apr. 24, 2019   (JP) .............................. JP2019-083277

(51) Int. Cl.
*B23P 15/10*     (2006.01)
*F16F 9/36*      (2006.01)
(Continued)

(52) U.S. Cl.
CPC .............. *B23P 15/10* (2013.01); *F16F 9/062* (2013.01); *F16F 9/364* (2013.01); *F16F 9/435* (2013.01)

(58) Field of Classification Search
CPC .............. F16F 9/062; F16F 9/435; F16F 9/364
See application file for complete search history.

(56) References Cited

U.S. PATENT DOCUMENTS 4,044,866 A * 8/1977 Ishida ..................... F16F 9/432
188/352
4,446,895 A * 5/1984 Kato ....................... F16F 9/432
141/4

(Continued)

FOREIGN PATENT DOCUMENTS

JP    2013-113402 A    6/2013

OTHER PUBLICATIONS

International Search Report received in corresponding International Application No. PCT/JP2020/001025 dated Mar. 10, 2020.

(Continued)

*Primary Examiner* — Sarang Afzali
(74) *Attorney, Agent, or Firm* — Mattingly & Malur, PC

(57) ABSTRACT

A production method for a cylinder device includes a first liquid injection step of injecting a first predetermined amount of working fluid into the inner cylinder, a first piston rod insertion step of inserting an assembly of the piston rod and the piston into the inner cylinder to dispose the piston at a predetermined position inside the inner cylinder, a second liquid injection step of injecting a second predetermined amount of the working fluid into an upper side of the piston inside the inner cylinder, and a closing step of closing the opening of the outer cylinder with the closing member.

5 Claims, 6 Drawing Sheets

(51) Int. Cl.
*F16F 9/43* (2006.01)
*F16F 9/06* (2006.01)

(56) References Cited

U.S. PATENT DOCUMENTS

| | | | | |
|---|---|---|---|---|
| 6,360,856 B1 * | 3/2002 | Koh | ........................ | F16F 9/062 |
| | | | | 188/315 |
| 8,267,382 B2 * | 9/2012 | Yazaki | ...................... | F16F 9/43 |
| | | | | 188/315 |
| 10,145,436 B2 * | 12/2018 | Barefoot | ................... | F16F 9/34 |
| 11,280,380 B2 * | 3/2022 | Knapczyk, II | .......... | F16F 9/065 |

OTHER PUBLICATIONS

Written Opinion received in corresponding International Application No. PCT/JP2020/001025 dated Mar. 10, 2020.

* cited by examiner

PRODUCTION METHOD FOR A CYLINDER DEVICE

TECHNICAL FIELD

The present invention relates to a production method for a cylinder device.

Priority is claimed on Japanese Patent Application No. 2019-083277, filed on Apr. 24, 2019, the content of which is incorporated herein by reference.

BACKGROUND ART

A technique is known in which a predetermined amount of oil liquid is injected into a cylinder by disposing a nozzle in an upper portion of the cylinder and discharging the oil liquid downward from a liquid injection port provided in the nozzle (for example, refer to Patent Document 1).

CITATION LIST

Patent Document

[Patent Document 1]
Japanese Unexamined Patent Application, First Publication No. 2013-113402

SUMMARY OF INVENTION

Technical Problem

Incidentally, a cylinder device needs to be improved in productivity.

Therefore, an object of the present invention is to provide a production method for a cylinder device which can improve productivity.

Solution to Problem

According to an aspect of the present invention, there is provided a production method for a cylinder device which includes a first liquid injection step of injecting a first predetermined amount of a working fluid into an inner cylinder, a first piston rod insertion step of inserting an assembly of a piston rod and a piston into the inner cylinder to dispose the piston at a predetermined position inside the inner cylinder, a second liquid injection step of injecting a second predetermined amount of the working fluid into an upper side of the piston inside the inner cylinder, and a closing step of closing an opening of an outer cylinder with a closing member.

Advantageous Effects of Invention

According to the production method for a cylinder device, productivity can be improved.

DESCRIPTION OF EMBODIMENTS

Hereinafter, a production method for a cylinder device according to an embodiment of the present invention will be described with reference to the drawings.

Figure 1:
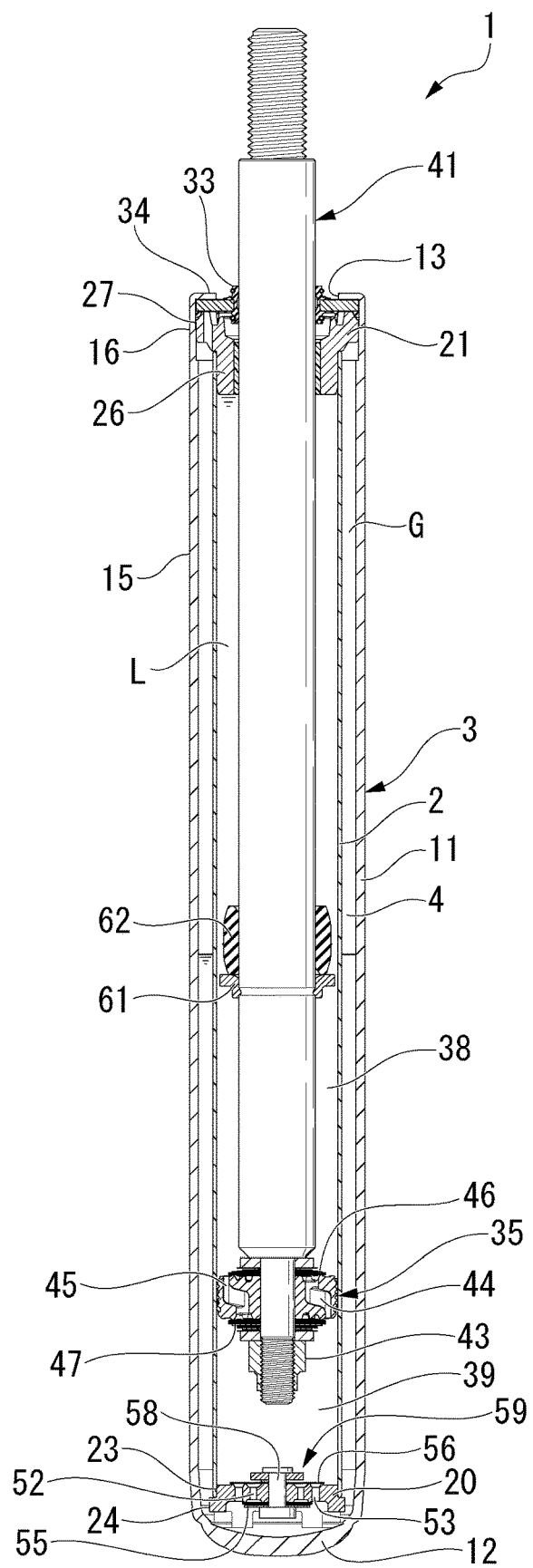
FIG. 1 is a cross-sectional view showing a cylinder device produced by a production method for a cylinder device according to an embodiment of the present invention.

FIG. 1 shows a cylinder device 1 produced by the production method of the present embodiment. The cylinder device 1 is a shock absorber used for a suspension device of a vehicle such as an automobile and a railroad vehicle. Specifically, the shock absorber is used for a strut type suspension of the automobile. The cylinder device 1 is a double-cylinder type cylinder device having a cylindrical inner cylinder 2 and a bottomed cylindrical outer cylinder 3 having a diameter larger than that of the inner cylinder 2 and provided on an outer peripheral side of the inner cylinder 2. A reservoir chamber 4 is formed between the outer cylinder 3 and the inner cylinder 2.

The outer cylinder 3 is an integrally molded product made of one metal member. The outer cylinder 3 has a cylindrical side wall portion 11, a bottom portion 12 that closes one end side of the side wall portion 11 in an axial direction, and an opening 13 on a side opposite to the bottom portion 12 in the side wall portion 11. In other words, the outer cylinder 3 covers the inner cylinder 2, one end thereof is closed, and the other end is open. Furthermore, in other words, one end of the outer cylinder 3 has the bottom portion 12, and the other end has the opening 13. The inner cylinder 2 is an integrally molded product made of one metal member, and has a cylindrical shape.

In the side wall portion 11 of the outer cylinder 3, a portion on the opening 13 side is a thin portion 16 that is thinner than the other main body portion 15. An outer diameter of the thin portion 16 is the same as an outer diameter of the main body portion 15, and an inner diameter thereof is larger than an inner diameter of the main body portion 15. In this manner, the thin portion 16 is thinner in a radial direction than the main body portion 15.

The cylinder device 1 has an annular base member 20 provided in one end portion of the inner cylinder 2 in the axial direction, and an annular rod guide 21 provided in the other end portion of the inner cylinder 2 and the outer cylinder 3 in the axial direction. An outer peripheral portion of the base member 20 has a small diameter portion 23 and a large diameter portion 24 having a larger diameter than that of the small diameter portion 23. An outer peripheral portion of the rod guide 21 also has a small diameter portion 26 and a large diameter portion 27 having a larger diameter than that of the small diameter portion 26.

The inner cylinder 2 is fitted to the small diameter portion 23 of the base member 20 until one end portion in the axial direction comes into contact with the large diameter portion 24 in the axial direction, and engages with the bottom portion 12 of the outer cylinder 3 via the base member 20. In addition, the inner cylinder 2 is fitted to the small diameter portion 26 of the rod guide 21 until the other end portion in the axial direction comes into contact with the large diameter portion 27 in the axial direction, and engages with the thin portion 16 of the outer cylinder 3 via the rod guide 21. In this state, the inner cylinder 2 is positioned in the radial direction with respect to the outer cylinder 3. Here, the base member 20 and the bottom portion 12 allows communication between the inner cylinder 2 and the outer cylinder 3, and form a reservoir chamber 4 as in a case between the inner cylinder 2 and the outer cylinder 3.

The cylinder device 1 has an annular closing member 33 on a side opposite to the bottom portion 12 in the rod guide 21. The closing member 33 is also fitted to an inner peripheral portion of the thin portion 16 as in the rod guide 21. A fastening portion 34 is formed in an end portion opposite to the bottom portion 12 in the side wall portion 11 by plastically deforming the thin portion 16 inward in the radial direction through fastening work such as curling work. The closing member 33 is pinched between the fastening portion 34 and the rod guide 21. The closing member 33 closes the opening 13 in the other end of the outer cylinder 3. Specifically, the closing member 33 is an oil seal. The closing member 33 may be configured of a seal washer.

The cylinder device 1 has a piston 35. The piston 35 is fitted to the inner cylinder 2 to be slidable. The piston 35 divides an inside of the inner cylinder 2 into two chambers such as a first chamber 38 and a second chamber 39. The first chamber 38 is provided between the piston 35 and the rod guide 21 inside the inner cylinder 2. The second chamber 39 is provided between the piston 35 and the base member 20 inside the inner cylinder 2. The second chamber 39 is partitioned from the reservoir chamber 4 by the base member 20. The first chamber 38 and the second chamber 39 are filled with an oil liquid L serving as a working fluid, and the reservoir chamber 4 is filled with a gas G and the oil liquid L serving as the working fluid.

The cylinder device 1 has a piston rod 41 having one end connected to the piston 35 and the other side protruding from the outer cylinder 3 via the opening 13. The piston 35 is connected to the piston rod 41 by a nut 43. The piston rod 41 extends outward from the inner cylinder 2 and the outer cylinder 3 through the rod guide 21 and the closing member 33. The piston rod 41 is guided by the rod guide 21, and moves integrally with the piston 35 in the axial direction with respect to the inner cylinder 2 and the outer cylinder 3.

The closing member 33 closes a portion between the opening 13 in the other end of the outer cylinder 3 and the piston rod 41, and restricts an outward leak of the oil liquid L inside the inner cylinder 2 and the gas G and the oil liquid L inside the reservoir chamber 4.

The piston 35 has a passage 44 and a passage 45 which penetrates in the axial direction. The passages 44 and 45 enable the first chamber 38 and the second chamber 39 to communicate with each other. The cylinder device 1 has an annular disc valve 46 that is capable of closing the passage 44 by coming into contact with the piston 35, on a side opposite to the bottom portion 12 in the axial direction of the piston 35. The cylinder device 1 has an annular disc valve 47 that is capable of closing the passage 45 by coming into contact with the piston 35, on a side opposite to the bottom portion 12 in the axial direction of the piston 35. The disc valves 46 and 47 are connected to the piston rod 41 together with the piston 35. The passage 44 is open to the second chamber 39, and the passage 45 is open to the first chamber 38.

In the disc valve 46, when the piston rod 41 moves to a contraction side where the amount of movement increases into the inner cylinder 2 and the outer cylinder 3, and the piston 35 moves in a direction of narrowing the second chamber 39, thereby a pressure in the second chamber 39 becomes higher than a pressure of the first chamber 38 by a predetermined or greater value, then the passage 44 is opened so that the oil liquid L of the second chamber 39 flows to the first chamber 38. In this case, the disc valve 46 generates a damping force. In the disc valve 47, when the piston rod 41 moves to an extension side that increases the amount of protruding from the inner cylinder 2 and the outer cylinder 3, and the piston 35 moves in a direction of narrowing the first chamber 38, thereby the pressure in the first chamber 38 becomes higher than the pressure in the second chamber 39 by a predetermined or greater value, then the passage 45 is opened so that the oil liquid L of the first chamber 38 flows to the second chamber 39. In this case, the disc valve 47 generates the damping force.

At least one of the piston 35 and the disc valve 46 has a fixed orifice (not shown) that enables the first chamber 38 and the second chamber 39 to communicate with each other via the passage 44 even in a state where the disc valve 46 maximally closes the passage 44. In addition, at least one of the piston 35 and the disc valve 47 also has a fixed orifice (not shown) that enables the first chamber 38 and the second chamber 39 to communicate with each other via the passage 45 even in a state where the disc valve 47 maximally closes the passage 45.

The base member 20 has a passage 52 and a passage 53 which penetrate in the axial direction. The passages 52 and 53 enable the second chamber 39 and the reservoir chamber 4 to communicate with each other. The cylinder device 1 has an annular disc valve 55 that is capable of closing the passage 52 by coming into contact with the base member 20, on the bottom portion 12 side in the axial direction of the base member 20. The cylinder device 1 has an annular disc valve 56 that is capable of closing the passage 53 by coming into contact with the base member 20, on a side opposite to the bottom portion 12 in the axial direction of the base member 20. The disc valves 55 and 56 are connected to the base member 20 by a connection member 58. The base member 20, the disc valves 55 and 56, and the connection member 58 configure a base valve 59. The passage 52 always communicates with the second chamber 39, and the passage 53 always communicates with the reservoir chamber 4.

In the disc valve 55, when the piston rod 41 moves to the contraction side and the piston 35 moves in the direction of narrowing the second chamber 39, thereby the pressure in the second chamber 39 becomes higher than the pressure in the reservoir chamber 4 by a predetermined or greater value, then the passage 52 is opened. In this case, the disc valve 55 generates the damping force. In the disc valve 56, when the piston rod 41 moves to the extension side, and the piston 35 moves to the first chamber 38 side, thereby the pressure in the second chamber 39 becomes lower than the pressure in the reservoir chamber 4, then the passage 53 is opened. In this case, the disc valve 56 is a suction valve that causes the oil liquid L to flow from the reservoir chamber 4 into the second chamber 39 without substantially generating the damping force.

A locking member 61 is fixed to the piston rod 41 between the piston 35 and the rod guide 21. The piston rod 41 has a shock-absorbing member 62 provided between the locking member 61 and the rod guide 21. The shock-absorbing member 62 is in contact with the locking member 61. When the piston rod 41 moves to a predetermined position on the extension side, the shock-absorbing member 62 comes into contact with the rod guide 21 to absorb an impact.

Next, a production method for the cylinder device 1 according to the present embodiment will be described.

Figure 2:
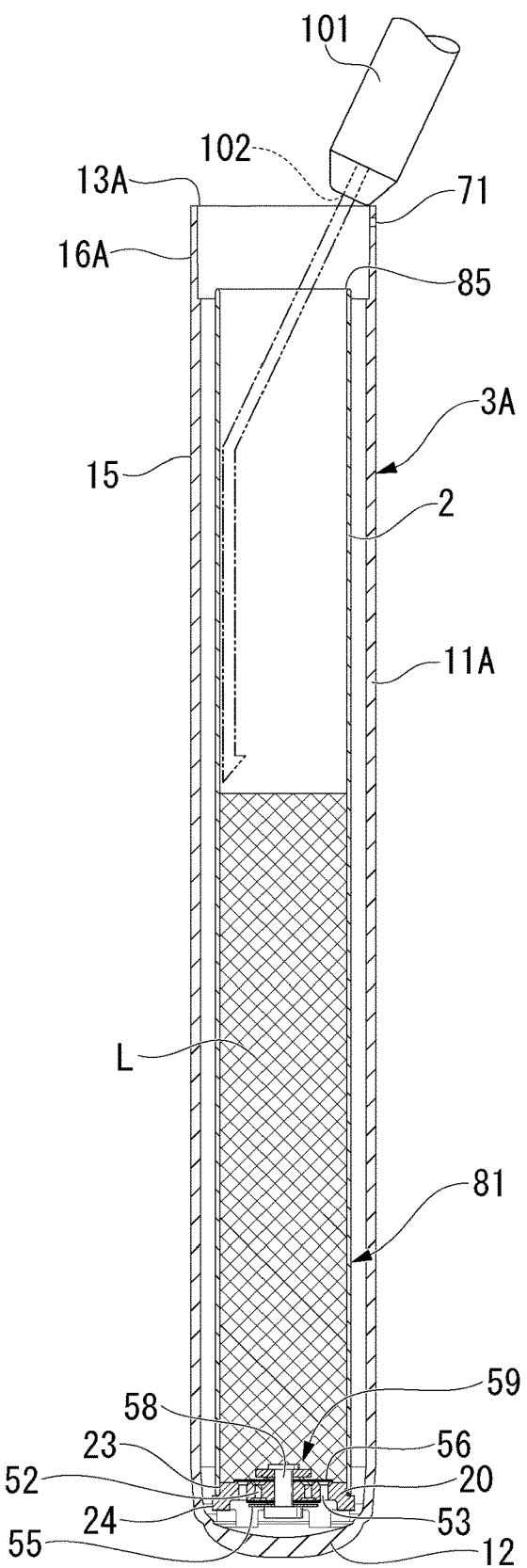
FIG. 2 is a cross-sectional view showing a first liquid injection step of the production method for a cylinder device according to the embodiment of the present invention.

When the cylinder device 1 is assembled, a bottomed cylindrical outer cylinder 3A as shown in FIG. 2 before the fastening portion 34 is formed is prepared. The outer cylinder 3A has a side wall portion 11A including a cylindrical thin portion 16A before the fastening portion 34 is formed and the main body portion 15. The side wall portion 11A has an opening 13A formed on a side opposite to the bottom portion 12. In the thin portion 16A, a gas filling hole 71 is formed to penetrate in the radial direction at a predetermined position in the vicinity of the opening 13A.

In addition, in a first sub-assembly step, a first sub-assembly 81 in which the base valve 59 is previously assembled to one end of the inner cylinder 2 in the axial direction is prepared in advance. In this case, in the base valve 59, the base member 20 causes the small diameter portion 23 to be fitted to one end of the inner cylinder 2 in the axial direction until the large diameter portion 24 comes into contact in the axial direction. The first sub-assembly 81 has an opening 85 formed on a side opposite to the base member 20 in the inner cylinder 2.

Figure 4:
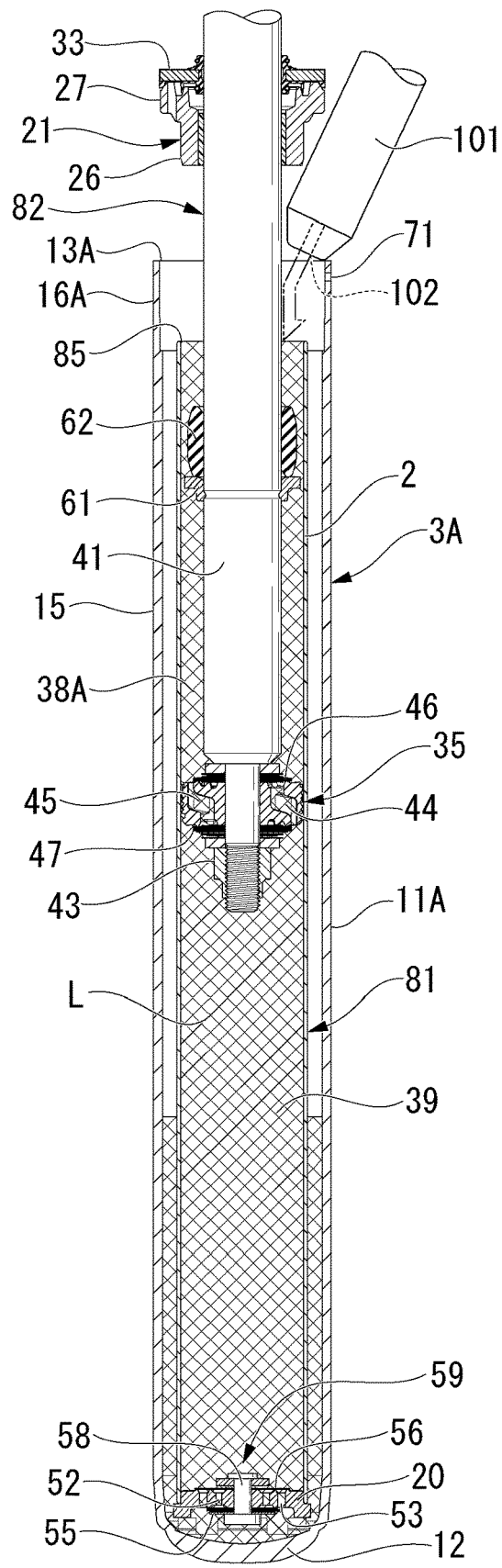
FIG. 4 is a cross-sectional view showing a second liquid injection step of the production method for a cylinder device according to the embodiment of the present invention.

In addition, in a second sub-assembly step, as shown in FIG. 4, the locking member 61 is fixed to the piston rod 41, and the disc valves 46 and 47 and the piston 35 are attached to the piston rod 41 by the nut 43. At the same time, the shock-absorbing member 62, the rod guide 21, and the closing member 33 are fitted to a side opposite to the piston 35 from the locking member 61 of the piston rod 41, and a second sub-assembly 82 is prepared in advance. Therefore, the second sub-assembly 82 has the piston rod 41, the locking member 61, the disc valves 46 and 47, the piston 35, the nut 43, the shock-absorbing member 62, the rod guide 21, and the closing member 33.

Then, first, as shown in FIG. 2, a gripping mechanism (not shown) of a production apparatus performs an outer cylinder setting step S1 as follows. The outer cylinder 3A before the fastening portion 34 is formed is set on a support base (not shown) of the production apparatus, in a state where the opening 13A is located in an upper portion in a vertical direction and the bottom portion 12 is located in a lower portion in the vertical direction. The outer cylinder 3A set on the support base is held in a state where a central axis extends in the vertical direction.

Next, the gripping mechanism (not shown) of the production apparatus performs an inner cylinder disposition step S2 as follows. The first sub-assembly 81 is inserted into the outer cylinder 3A from the opening 13A while the base valve 59 is moved ahead, and the base member 20 is brought into contact with the bottom portion 12. After the inner cylinder disposition step S2, the opening 85 of the inner cylinder 2 is located on a lower side from the opening 13A and the gas filling hole 71 of the outer cylinder 3A. In other words, a height position of an upper end of the inner cylinder 2 is located on a lower side from a height position of an upper end of the outer cylinder 3A, and is located on a lower side from a height position of a lower end of the gas filling hole 71.

Next, a first liquid injection step S3 is performed as follows. A nozzle 101 of the production apparatus injects a first predetermined amount of the oil liquid L into the inner cylinder 2 from the opening 85 in the upper portion. The first predetermined amount is a value smaller than a volume inside the first sub-assembly 81. In this manner, the oil liquid L is injected into the inner cylinder 2 to a predetermined position in an intermediate portion in the axial direction by the first liquid injection step S3. The first liquid injection step S3 is a step of injecting the first predetermined amount of the oil liquid L into the inner cylinder 2.

During the first liquid injection step S3, the nozzle 101 is disposed so that a liquid injection port 102 for linearly ejecting the oil liquid L is located within a range in the radial direction of the opening 13A of the outer cylinder 3A in a horizontal direction, and an ejecting direction of the oil liquid L is inclined with respect to the central axis of the inner cylinder 2. In addition, during the first liquid injection step S3, the nozzle 101 is disposed so that the oil liquid L ejected by the liquid injection port 102 hits the predetermined intermediate position on an upper portion side of an inner peripheral surface of the inner cylinder 2 after passing through the inside of a range in the radial direction of the opening 85 of the inner cylinder 2 from the inside of a range in the radial direction of the opening 13A of the outer cylinder 3A.

Therefore, the oil liquid L ejected from the liquid injection port 102 of the nozzle 101 in the first liquid injection step S3 hits the inner peripheral surface of the inner cylinder 2, is guided to the inner peripheral surface of the inner cylinder 2, flows down along the inner peripheral surface of the inner cylinder 2, and is accumulated on the base valve 59 inside the inner cylinder 2. Since the oil liquid L flows along the inner peripheral surface of the inner cylinder 2 in this way, foaming of the oil liquid L can be prevented. In this case, the passage 52 is closed by the disc valve 55, and the passage 53 is closed by the disc valve 56. Accordingly, the oil liquid L does not flow out to the reservoir chamber 4.

Next, a centering step S4 is performed as follows. The inner cylinder 2 is positioned in the radial direction with respect to the outer cylinder 3A by a centering mechanism (not shown) of the production apparatus, and the inner cylinder 2 is disposed coaxially with the outer cylinder 3A. The centering step S4 is a step of centering the inner cylinder 2 with respect to the outer cylinder 3A.

Figure 3:
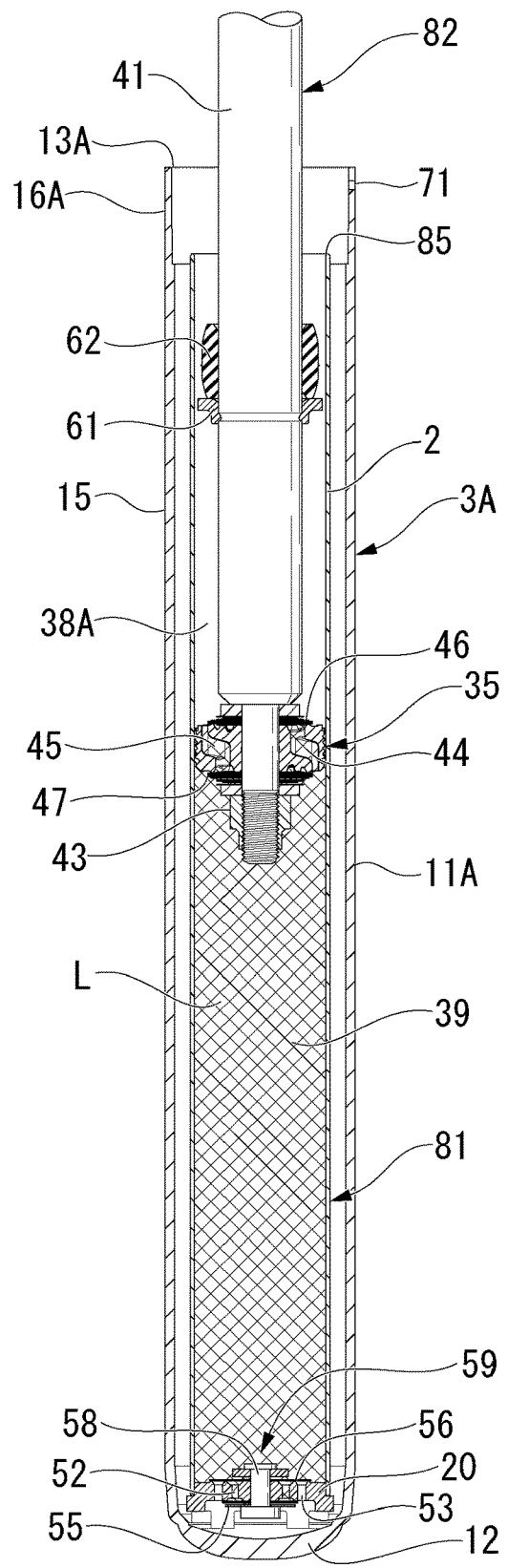
FIG. 3 is a cross-sectional view showing a first piston rod insertion step of the production method for a cylinder device according to the embodiment of the present invention.

Next, as shown in FIG. 3, a first piston rod insertion step S5 is performed as follows. The second sub-assembly 82 is inserted into the inner cylinder 2 from the opening 13A of the outer cylinder 3A and the opening 85 of the inner cylinder 2 by the gripping mechanism of the production apparatus while the nut 43 is moved ahead. The piston 35 is disposed at a predetermined position inside the inner cylinder 2. The first piston rod insertion step S5 is a step of inserting the second sub-assembly 82 which is an assembly of the piston rod 41 and the piston 35 into the inner cylinder 2 so that the piston 35 is disposed at the predetermined position inside the inner cylinder 2. Here, the predetermined position means a liquid level position when the oil liquid L which is the first predetermined amount of the working fluid is injected only into the inner cylinder 2. Since the centering step S4 is performed before the first piston rod insertion step S5, damage to the piston 35 can be prevented.

During the first piston rod insertion step S5, the second sub-assembly 82 is inserted so that a lower end of the piston 35 is disposed at the liquid level position of the oil liquid L inside the inner cylinder 2. In other words, a first predetermined position where the oil liquid L is injected into the first liquid injection step S3 and a second predetermined position where the lower end which is one end in the axial direction of the piston 35 is disposed in the first piston rod insertion step S5 are the same position. During the first piston rod insertion step S5, as shown in FIG. 4, the rod guide 21 and the closing member 33 are positioned on an upper side from the opening 13A of the outer cylinder 3A, that is, outside the outer cylinder 3A.

Next, a second liquid injection step S6 is performed as follows. The nozzle 101 of the production apparatus injects a second predetermined amount of the oil liquid L into the inner cylinder 2 from above. In this manner, the oil liquid L is injected into an upper end side which is the other end in the axial direction of the piston 35 inside the inner cylinder 2. The second liquid injection step S6 is a step of injecting the second predetermined amount of the oil liquid L into an upper portion of the piston 35 inside the inner cylinder 2.

During the second liquid injection step S6, the nozzle 101 is disposed so that the liquid injection port 102 for ejecting the oil liquid L is located within a range in the radial direction of the opening 13A of the outer cylinder 3A in the horizontal direction, and the ejecting direction of the oil liquid L is inclined with respect to the central axis of the inner cylinder 2 and the piston rod 41. In addition, during the second liquid injection step S6, the nozzle 101 is disposed so that the oil liquid L ejected by the liquid injection port 102 hits a predetermined intermediate position between the piston 35 of the piston rod 41 and the rod guide 21 inside the outer cylinder 3A.

Therefore, the oil liquid L ejected from the liquid injection port 102 of the nozzle 101 in the second liquid injection step S6 hits the outer peripheral surface of the piston rod 41 inside the outer cylinder 3A, is guided to the outer peripheral surface of the piston rod 41, and flows along the outer peripheral surface of the piston rod 41. The oil liquid L is subsequently guided to the outer peripheral surface of the shock-absorbing member 62, flows along the outer peripheral surface of the shock-absorbing member 62, is subsequently guided to the outer peripheral surface of the locking member 61, flows along the outer peripheral surface of the locking member 61, is guided again to the outer peripheral surface of the piston rod 41, flows along the outer peripheral surface of the piston rod 41, and is accumulated on the piston 35 inside the inner cylinder 2.

In other words, in the second liquid injection step S6, during the liquid injection, the oil liquid L is injected along the piston rod 41 by using the nozzle 101 including the liquid injection port 102 facing a direction of the piston rod 41. Since the oil liquid L flows along the outer peripheral surface of the piston rod 41 in this way, foaming of the oil liquid L can be prevented.

During the second liquid injection step S6, the second predetermined amount of the oil liquid L injected into the inner cylinder 2 is the amount of the oil liquid L overflowing from the opening 85 of the inner cylinder 2. Therefore, after the inside of the inner cylinder 2 is fully filled with the oil liquid L, the oil liquid L overflows from the opening 85 of the inner cylinder 2, is guided to the outer peripheral surface of the inner cylinder 2 and the inner peripheral surface of the outer cylinder 3A, and flows down along the outer peripheral surface and the inner peripheral surface. The oil liquid L is accumulated on the bottom portion 12 between the inner cylinder 2 and the outer cylinder 3A. In the oil liquid L injected by the second predetermined amount, a liquid level between the outer cylinder 3A and the inner cylinder 2 is located on a lower side from the opening 85 of the inner cylinder 2. Here, a value obtained by adding the first predetermined amount and the second predetermined amount is a filling amount inside the cylinder device 1 filled with the oil liquid L.

As described above, in the first liquid injection step S3, the oil liquid L is injected into a portion serving as the second chamber 39 between the base valve 59 and the piston 35. After the first piston rod insertion step S5, in the second liquid injection step S6, the oil liquid L is injected into the first chamber 38A serving as the first chamber 38 later, on a side opposite to the base valve 59 in the piston 35. In the first liquid injection step S3, the oil liquid L accumulated between the outer cylinder 3A and the inner cylinder 2 can be eliminated. In addition, a space portion remaining inside the inner cylinder 2 can be reduced by performing the first liquid injection step S3, the first piston rod insertion step S5, and the second liquid injection step S6. Accordingly, in the second liquid injection step S6, the amount of the oil liquid L accumulated between the outer cylinder 3A and the inner cylinder 2 can be reduced. Therefore, the amount of the oil liquid L between the outer cylinder 3A and the inner cylinder 2 is reduced after the second liquid injection step S6.

Figure 5:
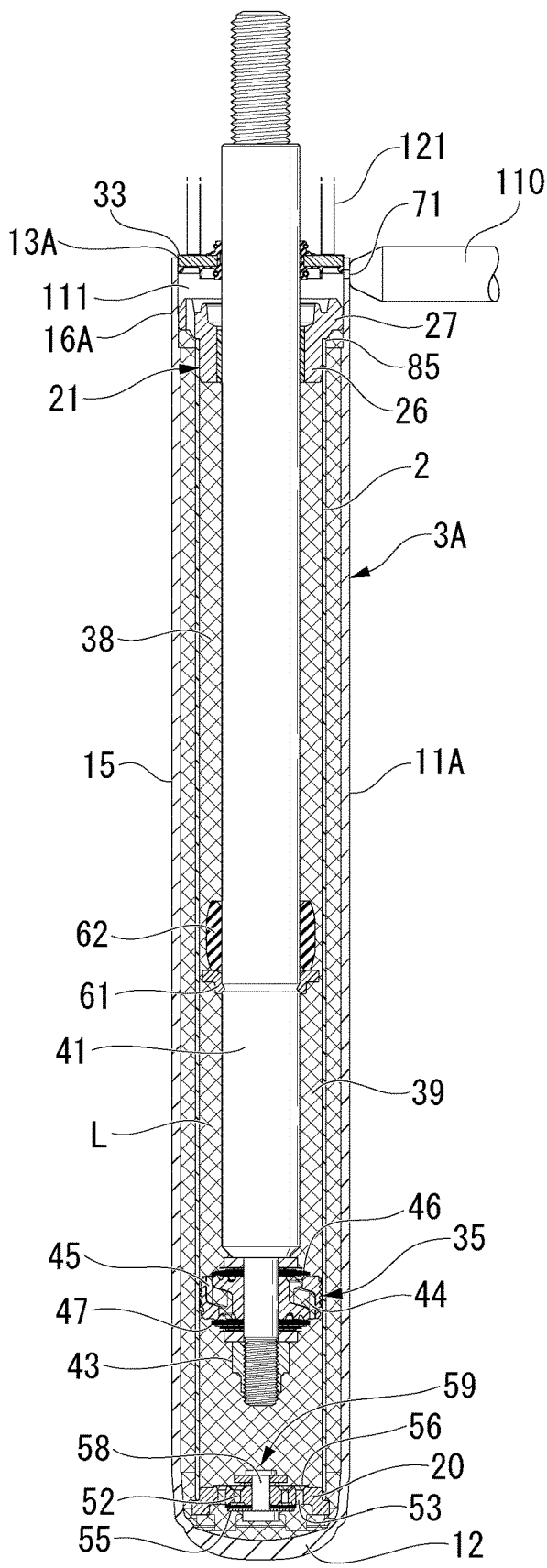
FIG. 5 is a cross-sectional view showing a gas filling step of the production method for a cylinder device according to the embodiment of the present invention.
Figure 6:
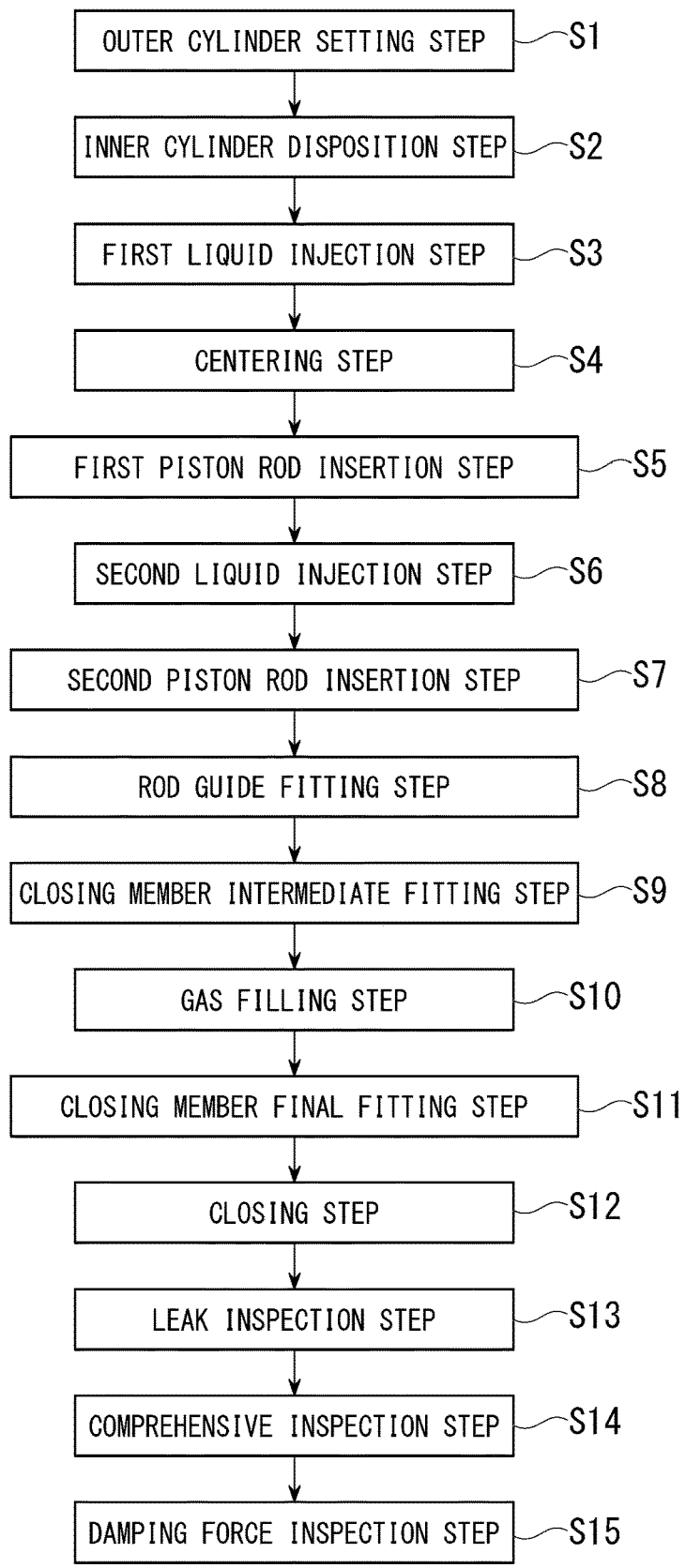
FIG. 6 is a flowchart of the production method for a cylinder device according to the embodiment of the present invention.

Next, as shown in FIG. 5, a second piston rod insertion step S7 is performed as follows. A gripping mechanism (not shown) of the production apparatus inserts the piston rod 41 into a predetermined position so that the piston 35 is located at a third predetermined position on the base valve 59 side from a second predetermined position. The predetermined position is a minimum length position where the piston rod 41 causes the cylinder device 1 to have a minimum length. Therefore, the second piston rod insertion step S5 is a step of inserting the second sub-assembly 82 which is an assembly of the piston rod 41 and the piston 35, up to a predetermined minimum length position. Here, the minimum length position is a setting position that limits an operation range on a vehicle side so that the piston rod 41 is not located on the base valve 59 side beyond the minimum length position.

In the related art, the filling amount of the oil liquid L is injected by injecting a substantially full amount of the oil liquid L into the inner cylinder 2 and injecting the oil liquid L remaining between the outer cylinder 3A and the inside of the inner cylinder 2 into the inner cylinder 2. Thereafter, the piston 35 and the piston rod 41 are inserted into the inner cylinder 2 up to the minimum length position. In this case, during the insertion of the piston 35, when the amount of the oil liquid L passing through the piston 35 from the second chamber 39 side and flowing to the first chamber 38A side serving as the first chamber 38 later decreases, the oil liquid L cannot flow to fully fill a volume of the first chamber 38A with the oil liquid L. Therefore, the amount of the oil liquid L passing through the base valve 59 from the second chamber 39 and flowing out between the outer cylinder 3A and the inner cylinder 2 increases, and the oil liquid L between the outer cylinder 3A and the inner cylinder 2 overflows upward from between both of these. In this case, the oil liquid L may come into contact with the inner peripheral surface of the outer cylinder 3A in a range in contact with the closing member 33 in a closing step S12 (to be described later). In a worst case, the oil liquid L may leak outward of the outer cylinder 3A from the gas filling hole 71 or the opening 13A of the outer cylinder 3A.

In contrast, in the present embodiment, as described above, the oil liquid L is injected into the second chamber 39 in advance in the first liquid injection step S3. After the first piston rod insertion step S5, the oil liquid L is injected into the first chamber 38 in the second liquid injection step S6. Accordingly, in the second piston rod insertion step S7 after the second liquid injection step S6, even when the piston 35 and the piston rod 41 are pushed to the predetermined minimum length position, it is possible to reduce the amount of the oil liquid L passing through the base valve 59 from the second chamber 39 and flowing out between the outer cylinder 3A and the inner cylinder 2. Therefore, it is possible to prevent the oil liquid L between the outer cylinder 3A and the inner cylinder 2 from overflowing upward from between both of these. Therefore, it is possible to prevent the oil liquid L from coming into contact with the inner peripheral surface of the outer cylinder 3A in the range in contact with the closing member 33 in the closing step S12 (to be described later), and it is also possible to prevent the oil liquid L from leaking outward of the outer cylinder 3A from the gas filling hole 71 or the opening 13A of the outer cylinder 3A.

Moreover, the oil liquid L is injected into the second chamber 39 in advance in the first liquid injection step S3. After the first piston rod insertion step S5, the oil liquid L is injected into the first chamber 38A in the second liquid injection step S6. In this manner, the oil liquid L accumulated between the outer cylinder 3A and the inner cylinder 2 can be eliminated in the first liquid injection step S3, and the amount of the oil liquid L accumulated between the outer cylinder 3A and the inner cylinder 2 can be reduced in the second liquid injection step S6. Therefore, it is possible to further prevent the oil liquid L between the outer cylinder 3A and the inner cylinder 2 from overflowing upward from between both of these.

Next, as shown in FIG. 5, a pushing mechanism (not shown) of the production apparatus performs a rod guide fitting step S8 as follows. The rod guide 21 is moved along the piston rod 41, and is fitted into the outer cylinder 3A and into the inner cylinder 2. In this case, the rod guide 21 is fitted to the inner cylinder 2, and the small diameter portion 26 is fitted until the rod guide 21 is stopped after coming into contact the large diameter portion 27 in the axial direction. The rod guide fitting step S8 may be performed before the second piston rod insertion step S7.

Next, a pressing mechanism 121 of the production apparatus performs a closing member intermediate fitting step S9 as follows. The closing member 33 is moved along the piston rod 41, and is fitted to an upper range from the gas filling hole 71 of the thin portion 16A.

Next, a gas filling step S10 is performed where a gas G having a pressure higher than an atmospheric pressure is filled from the gas filling hole 71 of the side wall portion by the gas filling nozzle 110 of the production apparatus. In this case, the gas G is introduced into the chamber 111 surrounded by the side wall portion 11A, the closing member 33, the rod guide 21, and the piston rod 41. The chamber 111 communicates between the outer cylinder 3A and the inner cylinder 2 via a gap between the thin portion 16A and the rod guide 21. Accordingly, the reservoir chamber 4 formed between the inner cylinder 2 and the outer cylinder 3 is filled later with the gas G filling the chamber 111. Therefore, the gas filling step S10 is a step of filling the reservoir chamber 4 formed between the inner cylinder 2 and the outer cylinder 3 with the gas G. In the gas filling step S10, the reservoir chamber 4 is filled with the gas G by the gas filling nozzle 110 via the gas filling hole 71 formed in the vicinity of the opening 13A of the outer cylinder 3A.

Next, the pressing mechanism 121 of the production apparatus performs a closing member final fitting step S11 as follows. The closing member 33 is pressed to move to a lower range from the gas filling hole 71 of the thin portion 16A, and is brought into contact with the rod guide 21.

Next, a fastening mechanism (not shown) of the production apparatus performs a closing step S12 as follows. The opening 13A side from the closing member 33 including a portion having the gas filling hole 71 of the thin portion 16A is plastically deformed inward in the radial direction. As shown in FIG. 1, the opening 13 of the outer cylinder 3 is closed with the closing member 33. Therefore, the closing step S12 is a step of closing the opening 13 of the outer cylinder 3.

Next, a leak inspection step S13 is performed as follows. An inspection head of a production apparatus (not shown) is disposed to form a chamber covering the piston rod 41, the closing member 33, and the opening 13 side of the outer cylinder 3. A pressure in the chamber is lowered to a predetermined pressure. Thereafter, it is determined whether or not a pressure rising value after the lapse of a predetermined time falls within a predetermined allowable value.

Here, as described above, even when the piston 35 and the piston rod 41 are inserted up to the predetermined minimum length position in the second piston rod insertion step S7, it is possible to prevent the oil liquid L between the outer cylinder 3A and the inner cylinder 2 from coming into contact with the range in contact with the closing member 33 on the inner peripheral surface of the outer cylinder 3A after overflowing upward from between both of these. Therefore, at the time of the leak inspection step S13, the oil liquid L is rarely present in a gap between the closing member 33 and the outer cylinder 3. When the oil liquid L is present in the gap between the closing member 33 and the outer cylinder 3, it is not possible to distinguish whether the gap between the closing member 33 and the outer cylinder 3 is properly sealed, or the gap is in a sealed state while the oil liquid L is present although the gap is not properly sealed. Therefore, accuracy of the leak inspection step is degraded. However, in the present embodiment, the accuracy can be prevented from being degraded, and the leak inspection step S13 can be accurately performed.

Thereafter, a damping force inspection step S15 is performed as follows. After a comprehensive inspection step S14 of performing a comprehensive inspection such as a visual inspection of an appearance is performed, it is inspected whether or not a predetermined damping force can be generated. Here, before the damping force inspection step S15 is performed, idling for expanding and contracting the cylinder device 1 needs to be performed to eliminate air entrainment. The oil liquid L is injected in the first liquid injection step S3 and the second liquid injection step S6 after the first piston rod insertion step S5. Accordingly, foaming of the oil liquid L can be prevented, and the air entrainment can be prevented. Therefore, the number of idling times can be reduced.

Patent Document 1 described above discloses a technique of injecting a predetermined amount of the oil liquid into the cylinder by disposing the nozzle in the upper portion of the cylinder and discharging the oil liquid downward from the liquid injection port provided in the nozzle. Incidentally, it is necessary to improve productivity of the cylinder device.

The production method for the cylinder device 1 of the present embodiment includes the first liquid injection step S3 of injecting the first predetermined amount of the oil liquid L into the inner cylinder 2, the first piston rod insertion step S5 of inserting the second sub-assembly 82 which is the assembly of the piston rod 41 and the piston 35 so that the piston 35 is disposed at the predetermined position inside the inner cylinder 2, and the second liquid injection step S6 of injecting the second predetermined amount of the oil liquid L to the upper side of the piston 35 inside the inner cylinder 2. Therefore, foaming of the oil liquid L can be prevented, and the air entrainment can be prevented. Therefore, the number of idling times for eliminating the air entrainment can be reduced, and the productivity can be improved.

In addition, the production method for the cylinder device 1 of the present embodiment includes the first liquid injection step S3, the first piston rod insertion step S5, and the second liquid injection step S6. Therefore, even when the second sub-assembly 82 between the piston 35 and the piston rod 41 is pushed to the predetermined minimum length position in the second piston rod insertion step S7 after the second liquid injection step S6, it is possible to prevent the oil liquid L between the outer cylinder 3A and the inner cylinder 2 from overflowing upward from between both of these. Therefore, it is possible to prevent the oil liquid L from forming an oil film after coming into contact with the inner peripheral surface of the outer cylinder 3A in the range in contact with the closing member 33 in the closing step S12.

In this way, it is possible to prevent the oil liquid L from coming into contact with the inner peripheral surface of the outer cylinder 3A in the range contacting with the closing member 33 in the closing step S12. Therefore, after the gas filling step S10 of filling a portion between the inner cylinder 2 and the outer cylinder 3A with the gas G and the closing step S12 of closing the opening 13 of the outer cylinder 3 are performed, a leak inspection between the closing member 33 and the outer cylinder 3 can be performed in the leak inspection step S13, and thus, the accuracy can be improved. Therefore, a defective product having a leak can be properly eliminated, and improved quality can be achieved.

In addition, it is possible to prevent the oil liquid L from leaking outward of the outer cylinder 3A from the gas filling hole 71 or the opening 13A of the outer cylinder 3A. Therefore, the inside of the cylinder device 1 can be filled with a proper amount of the oil liquid L, and the improved quality can be achieved from this point as well. It is possible to prevent the oil liquid L from leaking outward of the outer cylinder 3A. Accordingly, it is possible to prevent appearance quality from being degraded, and the improved quality can be achieved from this point as well. In addition, work for wiping off the oil liquid L adhering to the outside of the outer cylinder 3 does not need to be carried out, and improved productivity can be achieved.

In addition, the first liquid injection step S3, the first piston rod insertion step S5, and the second liquid injection step S6 are included. Accordingly, foaming of the oil liquid L can be prevented, and the air entrainment can be prevented. Therefore, the number of idling times before the damping force inspection of the cylinder device 1 can be reduced, and the productivity can be improved.

In addition, in the gas filling step S10, the portion between the outer cylinder 3A and the inner cylinder 2 is filled with the gas G via the gas filling hole 71 formed in the vicinity of the opening 13A of the outer cylinder 3A. Accordingly, the cylinder device 1 does not need to be assembled under an atmosphere of the gas G having a high pressure. Therefore, assembly equipment can be realized at low cost.

In addition, the first predetermined position where the first predetermined amount of the liquid is injected into the inner cylinder 2 in the first liquid injection step S3 and the second predetermined position where the piston 35 is disposed inside the inner cylinder 2 in the first piston rod insertion step S5 are equal to each other. Accordingly, the inside of the inner cylinder 2 can be preferably filled with the oil liquid L in the first liquid injection step S3 and the second liquid injection step S6. Therefore, the amount of the oil liquid L between the outer cylinder 3A and the inner cylinder 2 can decrease. Accordingly, when the piston 35 and the piston rod 41 are pushed to the predetermined minimum length position in the second piston rod insertion step S7 after the second liquid injection step S6, it is possible to further prevent the oil liquid L between the outer cylinder 3A and the inner cylinder 2 from overflowing upward from between both of these. Therefore, it is possible to further prevent the oil liquid L from form the oil film after coming into contact with the inner peripheral surface of the outer cylinder 3A in the range in contact with the closing member 33 in the closing step S12.

In addition, in the first liquid injection step S3, during the liquid injection, the oil liquid L is injected along the inner peripheral surface of the inner cylinder 2 by using the nozzle 101 including the liquid injection port 102 facing the inner peripheral surface of the inner cylinder 2. Accordingly, foaming of the oil liquid L can be further prevented. Therefore, the air entrainment can be further prevented. Therefore, the number of idling times before the damping force inspection of the cylinder device 1 can be further reduced, and the productivity can be further improved.

In addition, in the second liquid injection step S6, during the liquid injection, the oil liquid L is injected along the piston rod 41 by using the nozzle 101 including the liquid injection port 102 facing the piston rod 41. Accordingly, foaming of the oil liquid L can be further prevented. Therefore, the air entrainment can be further prevented. Therefore, the number of idling times before the damping force inspection of the cylinder device 1 can be further reduced, and the productivity can be further improved.

According to a first aspect of the above-described embodiment, there is provided a production method for a cylinder device including an inner cylinder filled with a working fluid, a piston that divides an inside of the inner cylinder into two chambers, an outer cylinder that covers the inner cylinder, one end being closed and the other end open, a piston rod that has one end connected to the piston and the other end protruding from the outer cylinder, a rod guide provided in each end portion of the inner cylinder and the outer cylinder to guide the piston rod, and an annular closing member that closes an opening in the other end of the outer cylinder. The production method for a cylinder device includes a first liquid injection step of injecting a first predetermined amount of a working fluid into the inner cylinder, a first piston rod insertion step of inserting an assembly of the piston rod and the piston into the inner cylinder to dispose the piston at a predetermined position inside the inner cylinder, a second liquid injection step of injecting a second predetermined amount of the working fluid into an upper side of the piston inside the inner cylinder, and a closing step of closing the opening of the outer cylinder with the closing member. In this manner, the productivity can be improved.

According to a second aspect, in the first aspect, the production method for a cylinder device may further include a second piston rod insertion step of inserting the assembly of the piston rod and the piston up to a minimum length position after the second liquid injection step, and a gas filling step of filling a reservoir chamber formed between the inner cylinder and the outer cylinder with a gas.

According to a third aspect, in the second aspect, in the gas filling step, the reservoir chamber may be filled with the gas G via a gas filling hole formed in a vicinity of the opening of the outer cylinder.

According to fourth aspect, in any one of the first to third aspects, the predetermined position may be a liquid level position when the first predetermined amount of the working fluid is injected only into the inner cylinder.

According to a fifth aspect, in any one of the first to fourth aspects, in the second liquid injection step, during liquid injection, the working fluid may be injected along the piston rod by using a nozzle including a liquid injection port facing a direction of the piston rod.

INDUSTRIAL APPLICABILITY

The production method for the cylinder device according to the present application is applicable to the relevant field. Therefore, it is possible to provide the production method for the cylinder device which can improve the productivity.

REFERENCE SIGNS LIST

1: Cylinder device
2: Inner cylinder
3, 3A: Outer cylinder
4: Reservoir chamber
13, 13A: Opening
21: Rod guide
33: Closing member
35: Piston
38: First chamber
39: Second chamber
41: Piston rod
71: Gas filling hole
82: Second sub-assembly
101: Nozzle
102: Liquid injection port
L: Oil liquid (working fluid)
S3: First liquid injection step
S5: First piston rod insertion step
S6: Second liquid injection step
S7: Second piston rod insertion step
S10: Gas filling step
S12: Closing step

What is claimed is:

1. A production method for a cylinder device that includes:
    an inner cylinder filled with a working fluid;
    a piston that divides an inside of the inner cylinder into two chambers;
    an outer cylinder that covers the inner cylinder, one end being closed and the other end being open;
    a piston rod that has one end connected to the piston and the other end protruding outwardly from the inner cylinder and the outer cylinder;
    a rod guide provided in each end portion of the inner cylinder and the outer cylinder to guide the piston rod, and
    an annular closing member that closes an opening in the other end of the outer cylinder,
    the production method comprising the following steps in the following order:
    a first liquid injection step of injecting a first predetermined amount of a working fluid into the inner cylinder;
    a first piston rod insertion step of inserting an assembly of the piston rod and the piston into the inner cylinder to dispose the piston at a predetermined position inside the inner cylinder;
    a second liquid injection step of injecting a second predetermined amount of the working fluid into an upper side of the piston inside the inner cylinder; and
    a closing step of closing the opening of the outer cylinder with the closing member.

2. The production method for a cylinder device according to claim 1, further comprising:
    a second piston rod insertion step of inserting the assembly of the piston rod and the piston up to a minimum length position after the second liquid injection step; and
    a gas filling step of filling a reservoir chamber formed between the inner cylinder and the outer cylinder with a gas.

3. The production method for a cylinder device according to claim 2,
    wherein in the gas filling step, the reservoir chamber is filled with the gas via a gas filling hole formed in a vicinity of the opening of the outer cylinder.

4. The production method for a cylinder device according to claim 1,
    wherein the predetermined position is a liquid level position when the first predetermined amount of the working fluid is injected only into the inner cylinder.

5. The production method for a cylinder device according to claim 1,
    wherein in the second liquid injection step, during liquid injection, the working fluid is injected along the piston rod by using a nozzle including a liquid injection port facing a direction of the piston rod.

* * * * *